(12) United States Patent
Frederiksson et al.

(10) Patent No.: US 7,258,949 B2
(45) Date of Patent: Aug. 21, 2007

(54) BIPOLAR BATTERY AND A METHOD FOR MANUFACTURING A BIPOLAR BATTERY

(75) Inventors: Lars Frederiksson, Täby (SE); Neil H. Puester, Aurora, CO (US)

(73) Assignee: Nilar International AB, Taby (SE)

( * ) Notice: Subject to any disclaimer, the term of this patent is extended or adjusted under 35 U.S.C. 154(b) by 543 days.

(21) Appl. No.: 10/434,168

(22) Filed: May 9, 2003

(65) Prior Publication Data

US 2005/0260493 A1    Nov. 24, 2005

(30) Foreign Application Priority Data

Nov. 29, 2002    (SE)    ................................. 0203535-0

(51) Int. Cl.
*H01M 6/48* (2006.01)
*H01M 10/18* (2006.01)
*H01M 10/52* (2006.01)

(52) U.S. Cl. .......................... 429/210; 429/57; 429/89

(58) Field of Classification Search ................ 429/210, 429/6, 57, 89, 154
See application file for complete search history.

(56) References Cited

U.S. PATENT DOCUMENTS

| 4,008,099 | A | * | 2/1977 | Lindstrom | .................... | 429/59 |
| 4,164,068 | A |   | 8/1979 | Shropshire et al. | | |
| 4,275,130 | A |   | 6/1981 | Rippel et al. | | |
| 4,614,025 | A |   | 9/1986 | vanOmmering et al. | | |
| 5,344,723 | A | * | 9/1994 | Bronoel et al. | ................ | 429/84 |
| 5,618,641 | A | * | 4/1997 | Arias | ......................... | 429/210 |

FOREIGN PATENT DOCUMENTS

| EP | 0 631 338 A1 | 12/1994 |
| EP | 0 676 822 A1 | 10/1995 |
| WO | WO 01/03224 A1 | 1/2001 |
| WO | WO 01/03225 A1 | 1/2001 |

* cited by examiner

*Primary Examiner*—Tracy Dove
(74) *Attorney, Agent, or Firm*—Harness, Dickey & Pierce, P.L.C.

(57) ABSTRACT

The present invention relates to a bipolar battery, especially a NiMH battery, having: a sealed housing, a negative end terminal, a positive end terminal, and at least one biplate assembly comprising a biplate, a positive and a negative electrode. A separator is arranged between each negative and positive electrode forming a battery cell, said separator includes an electrolyte. An inner barrier of a hydrophobic material is arranged around at least one electrode, whereby said inner barrier prevents an electrolyte path from one cell to another cell, and a frame is present to provide predetermined cell spacing between each biplate and/or biplate and end terminal. The frame is attached in such a way to each biplate to permit ambient gas to pass between adjacent cells, thereby creating a common gas space for all cells in the battery. The invention also relates to a method for manufacturing a bipolar battery.

20 Claims, 4 Drawing Sheets

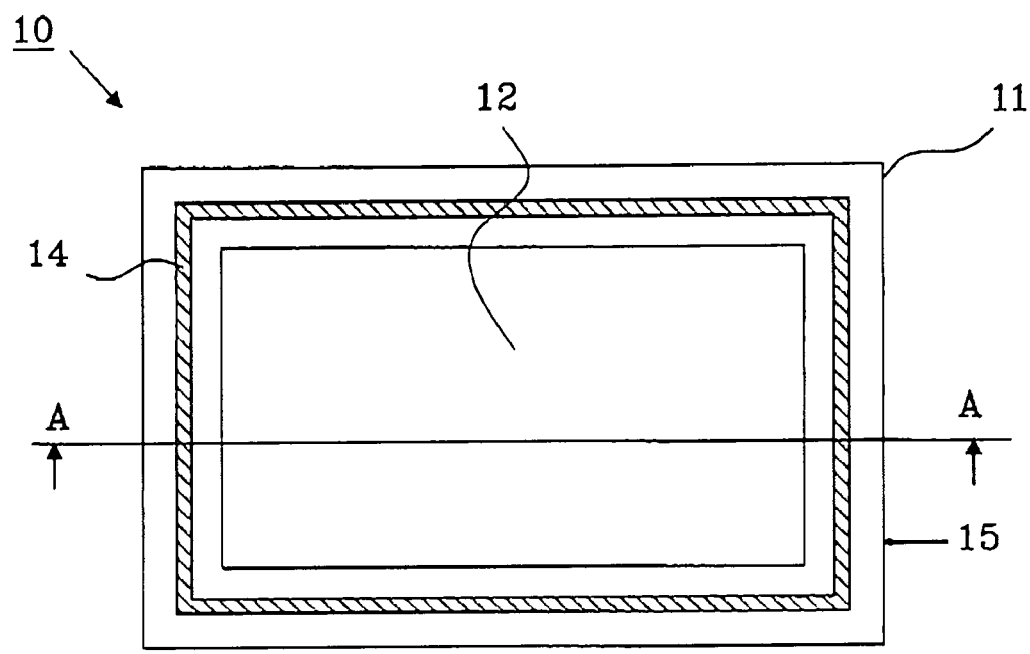
Fig. 1
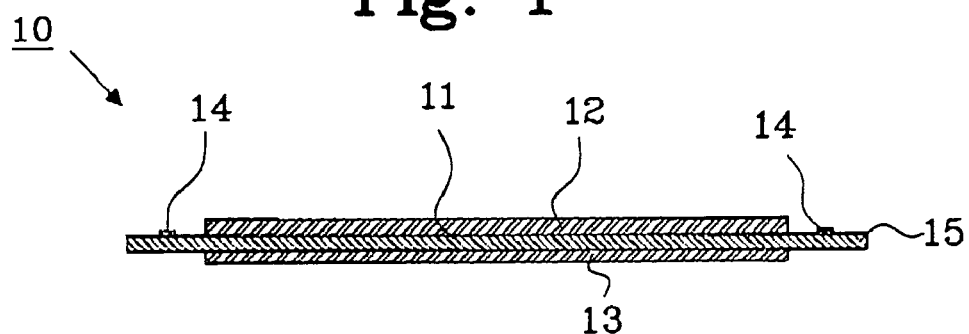
Fig. 2 (A-A)
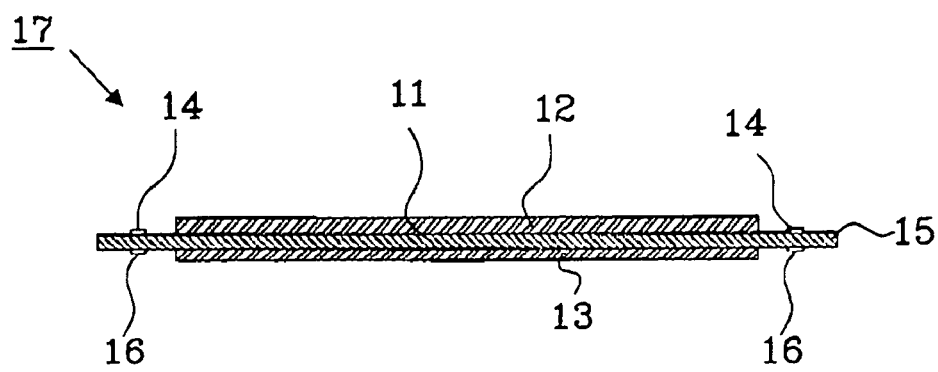
Fig. 3

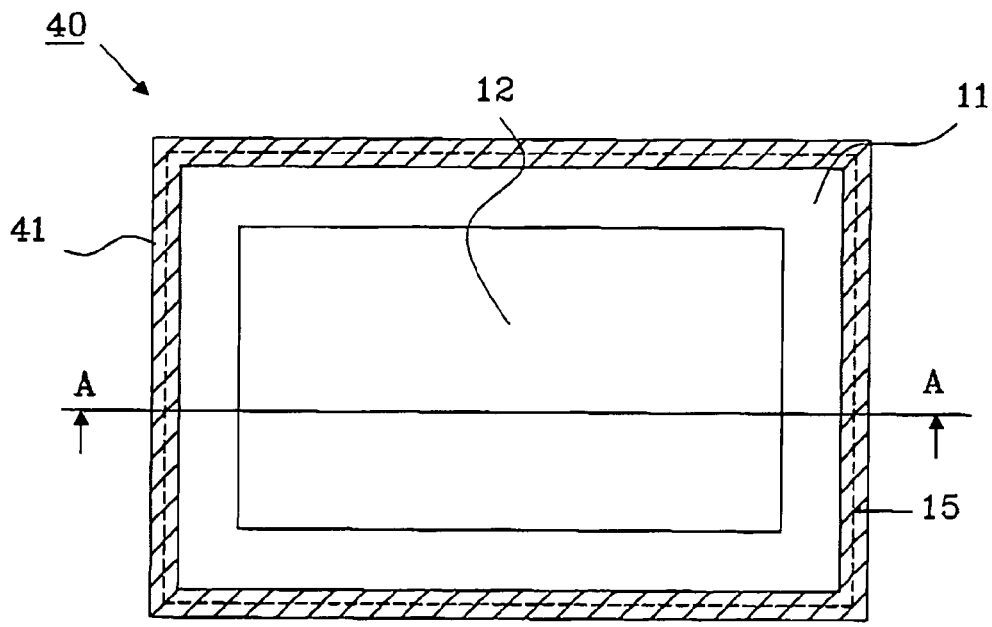
Fig. 6
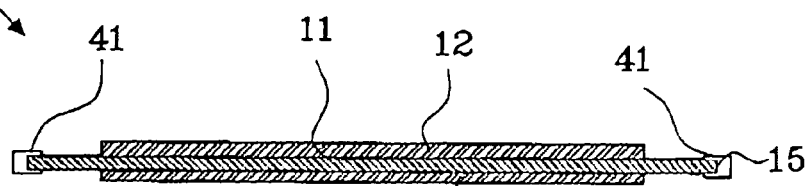
Fig. 7 (A-A)
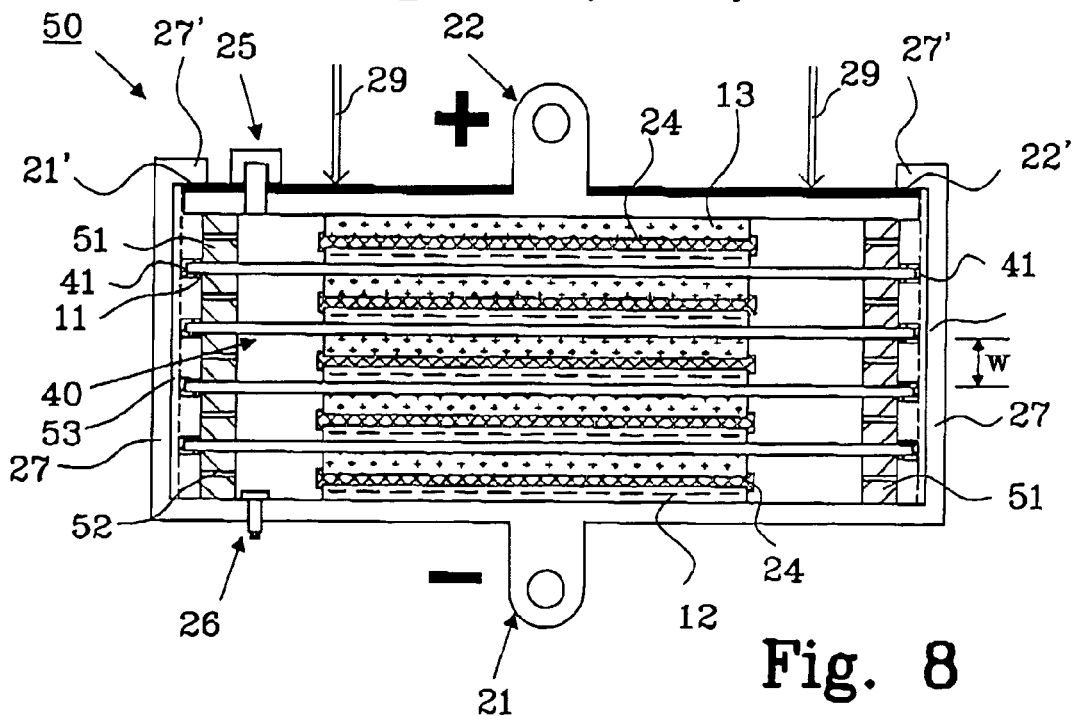
Fig. 8 though the outer sealing is not fluid-tight, the electrolyte, contained in the separator between the electrodes, may form an electrolyte path from one cell to another.

BIPOLAR BATTERY AND A METHOD FOR MANUFACTURING A BIPOLAR BATTERY

TECHNICAL FIELD

The present invention relates to a bipolar battery, especially a NiMH battery. The invention also relates to a method for manufacturing a bipolar battery.

BACKGROUND TO THE INVENTION

Traditionally, bipolar batteries including several cells have been designed to have separately sealed cells to contain both electrolyte and gas created during operation. A problem that has occurred is the creation of an electrolyte path between adjacent cells due to inadequate sealing properties, which in turn mainly depend on a pressure difference between adjacent cells. The pressure difference arises when a cell starts to gas before the cell next to it starts gassing. This is a normal behaviour of cells in a bipolar battery.

A solution to this problem has been suggested in U.S. Pat. No. 5,344,723 by Bronoel et al., which discloses a bipolar battery having a common gas chamber, which is created by providing an opening through the biplate (conductive support/separator). The opening is also provided with a hydrophobic barrier to prevent passage of electrolyte through the hole. Although the problem with pressure differences between the cells is solved, there is still a disadvantage with the described battery. The outer sealing around the edge of each biplate still has to be fluid-tight, which is very difficult to achieve. If the outer sealing is not fluid-tight, the electrolyte, contained in the separator between the electrodes, may form an electrolyte path from one cell to another.

Furthermore, the suggested solution is rather expensive to implement since an opening has to be made through the biplate to create the common pressure chamber. If the biplate is relatively thin, it is even harder to create an opening through the biplate because tears, stretching, or metal slivers may form.

There is a need for a battery that is easy to manufacture at affordable prices, and that are safe to handle during charge and discharge procedures.

SUMMARY OF THE INVENTION

The object of the present invention is to provide a bipolar battery, preferably a bipolar NiMH battery that has a simplified construction compared to prior art bipolar batteries.

This object is achieved by a bipolar battery and a method for manufacturing a bipolar battery.

An advantage with the present invention is that the bipolar battery is easier to manufacture compared to prior art bipolar batteries.

Another advantage is that the cost for manufacturing the bipolar battery is greatly reduced, while maintaining or even improving the operating properties of the bipolar battery.

Further objects and advantages of the present invention will be apparent to those skilled in the art from the following detailed description of the disclosed bipolar electrochemical battery and the biplate assembly.

BRIEF DESCRIPTION OF THE DRAWINGS

The different embodiments shown in the appended drawings are not to scale or proportion, but exaggerated to point out different important features for the sake of clarity.

FIG. 1 shows a planar view of a first embodiment of a biplate assembly according to the invention.

FIG. 2 shows a cross-sectional view along A-A in FIG. 1.

FIG. 3 shows a cross-sectional view of a second embodiment of a biplate assembly according to the invention.

FIG. 6 shows a planar view of a third embodiment of a biplate assembly according to the invention.

FIG. 7 shows a cross-sectional view along A-A in FIG. 6.

FIG. 8 shows a cross-sectional view of a third embodiment of a bipolar battery according to the present invention.

DETAILED DESCRIPTION OF PREFERRED EMBODIMENTS

Figure 4:
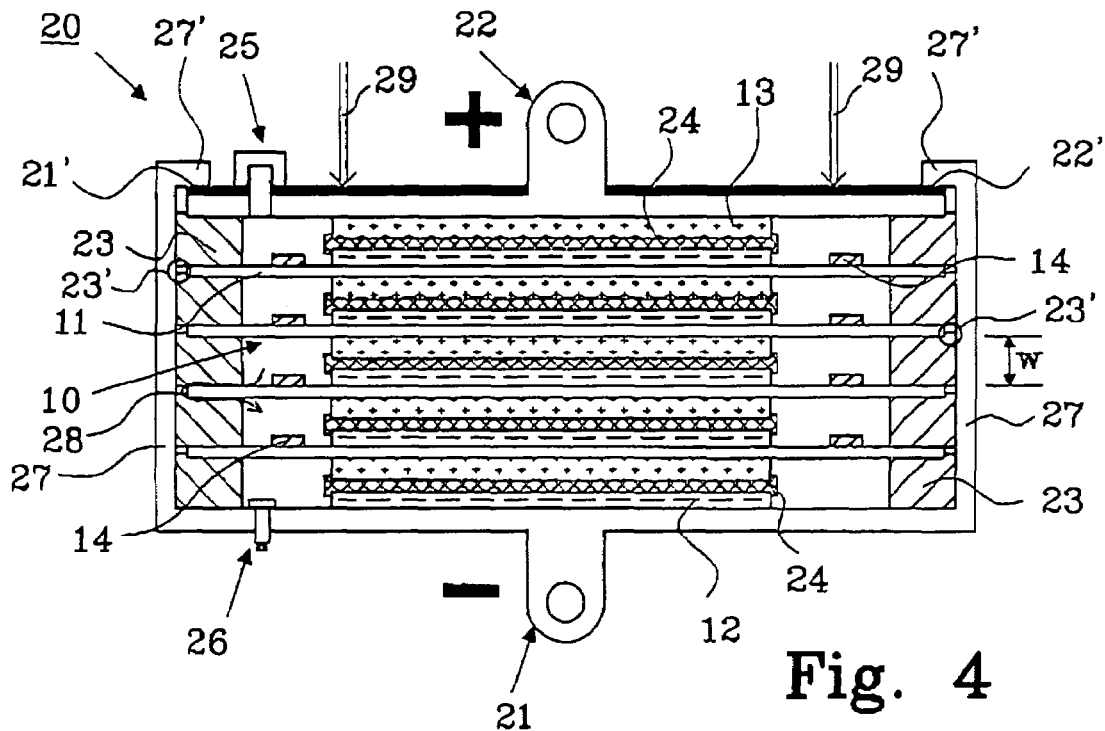
FIG. 4 shows a cross-sectional view of a first embodiment of a bipolar battery according to the present invention.

The major benefits of the bipolar battery design are simplicity and low resistance losses. The parts count of the battery is relative low, consisting only of end plates and biplates, with appropriate assembly and sealing components. Batteries of a desired voltage are constructed by stacking the required number of biplates. The electrical connections between the cells are made as the battery is stacked, since each biplate is electrically conductive and impervious to electrolyte.

With the terminals at each end, the flow of current is perpendicular to the plate, which ensures uniform current and voltage distribution. Since the current path is very short the voltage drop is significantly reduced.

Bipolar batteries will also have significantly reduced weight, volume and manufacturing costs due to elimination of components and the manufacturing approach.

The major problem with bipolar batteries that has not been commercially solved before is obtaining a reliable seal between cells within the bipolar battery.

The seal on a cell is of extreme importance for all types of batteries, and bipolar batteries are no exception. Individual cells contain the active materials (for NiMH batteries it is Nickel hydroxide positive and metal hydride hydrogen storage alloy negative, respectively), separator and electrolyte. The electrolyte is required for ion transport between the electrodes. The best designs, optimised for longevity, weight and volume, require recombination of gasses.

Batteries always produce gasses as they are charged. The gassing rate increases as the battery nears full charge, and reaches maximum when fully charged. The gasses which are produced are primarily oxygen and hydrogen.

Batteries considered for power applications have thin electrodes. Long life with minimum weight and volume are required attributes, which requires a sealed construction.

Oxygen will recombine rather rapidly, so batteries are designed so oxygen will be the first gas generated if the cell is overcharged or overdischarged. This requires two actions:

1) Overbuild the negative active material, generally by 30%, to ensure that the positive electrode, which will gas oxygen, will be the first to gas.
2) Provide for gas passage from the positive to the negative, where the oxygen will recombine. The gas passages are obtained by controlling the amount of electrolyte within the pores of the electrode and through the separator. All surfaces of the electrode must be covered by a thin layer of electrolyte for the transport of ions, but the layer must be thin enough to permit gas diffusion through the layer, and must allow gas passages throughout the active layers and the separator.

The negative electrode would gas hydrogen if overcharged. Because hydrogen does not recombine quickly, pressure would build up within the cell. The oxygen recombination effectively discharges the negative at the same rate it is being charged, thus preventing overcharge of the negative.

The surface area of the active material, combined with the uniform voltage distribution of the bipolar design, enhances rapid recombination.

The bipolar approach will ensure that the voltage drop across the active material will be uniform in all areas, so that the entire electrode will come up to full charge at the same time. This will eliminate the major problem in conventional constructions, where parts of an electrode are overcharging and gassing while other (remote) areas of the electrode are not yet fully charged.

The cells in regular batteries are sealed to contain the electrolyte both for proper performance of the cells, and to prevent electrolyte paths between adjacent cells. The presence of electrolyte paths between cells will allow the electrolyte-connected cells to discharge at a rate that is determined by the resistivity of the path (length of path and cross section of path). The seals on bipolar batteries are more important because the electrolyte path is potentially much shorter. It should be noted that an important feature of this disclosure is the use of a horizontal electrolyte barrier to significantly increase the length of the potential path. An additional concern is the amount of heat generated by operation of the cell Depending on the magnitude of heat generated, the design must be able to reject the heat and maintain a safe operating temperature.

If an electrolyte path is developed between cells, a small intercellular leakage can be overcome by the periodic full charging of the battery. The battery may be overcharged by a set amount and at a low rate. The low rate would allow fully charged cells to recombine gasses without generating pressure and dissipate the heat from the recombination/overcharge. Cells that have small intercellular electrical leakage paths would become balanced.

The flow of heat in a bipolar cell will occur in a radial direction, and in fact end plates are preferably somewhat insulated, to ensure that they operate at the same temperature as the rest of the battery.

It is rarely necessary that a battery be fully charged to achieve its useful function. Batteries are routinely over specified and overbuilt. If an operation requires 50 AH (Ampere Hours), the requirement is usually specified at least 10% higher. Since batteries lose capacity over their lifetime, the capacity of a new battery is increased by the expected loss, resulting in possibly a 70 AH requirement for a new battery in this example. The manufacturer will probably have a median design target of 75 AH to allow for variations in the manufacturing process. Much of this overbuild is to compensate for the life capacity degradation that is caused by the overcharging.

FIG. 1 is a planar view and FIG. 2 is a cross sectional view (along A-A in FIG. 1) of a first embodiment of a biplate assembly 10 comprising a biplate 11, preferably made from Nickel or Nickel plated steel. A negative electrode 12 and a positive electrode 13 are attached to opposite sides, respectively, of the biplate 11. Each electrode is, in this embodiment, arranged to cover only a central portion of the side of the biplate 11 to leave space between each electrode and the edge 15 of the biplate 11 for implementing a means for creating a common gas space for all cells in the battery as described in connection with FIGS. 4 and 5. A hydrophobic electrolyte barrier 14, preventing electrolyte leakage, is provided on one side of the biplate 11 around the electrode, preferably the negative electrode 12, as illustrated in the embodiment.

The essential part of the invention is that the electrolyte leakage around the perimeter of the electrodes is controlled by the hydrophobic barrier. It is not even necessary that the electrode covers a central portion of the biplate as long as there is sufficient space to implement the hydrophobic barrier and a frame that defines the width of each individual cell, as is discussed below.

The electrodes 12, 13 may be attached to the biplate 11 in many ways, but preferably the electrodes are manufactured directly onto the biplate by using pressed powder, as is disclosed in the published PCT application PCT/SE02/01359, with the title "A method for manufacturing a biplate assembly, a biplate assembly and a bipolar battery" by the same applicant. By using the method of pressing powder directly onto the biplate, thin electrodes having less active material may be manufactured.

The shape of the biplate is preferably rectangular to maximise the useful area of the biplate and to better use the biplate for heat conductive purposes. The maximum heat path will be limited to half the length of the shortest side of the rectangle.

The electrolyte barrier 14 is made from a suitable hydrophobic material, such as a flouropolymer or similar materials. The hydrophobic material may be applied to the biplate as a liquid or solid material and then cured in place, which will bond the barrier to the biplate in an efficient way to prevent electrolyte leakage between cells.

FIG. 3 shows a cross sectional partial view of a second embodiment of a biplate assembly 17 comprising a biplate 11, a negative electrode 12, a positive electrode 13 and a hydrophobic barrier 14 as described in connection with FIGS. 1 and 2. The second embodiment 17 also comprises an additional hydrophobic barrier 16 arranged around the positive electrode 13.

The means for creating a common gas space for all cells in a bipolar battery comprises a frame having a predetermined thickness which is the desired width of a cell. The frame is arranged between adjacent biplates and/or a biplate and an end plate, as described below. The frame is attached to the side of each biplate in a non-sealing manner to permit gas generated within a cell to escape the cell. In another embodiment, the frame is made with a thermoplastic elastomer compound that forms a better seal with the biplate, and one or more leakage channels can be moulded into the frame to ensure leakage path. When several biplate assemblies are stacked upon each other, as described in connection with FIGS. 4, 5 and 8, a common gas space will be created which will eliminate the pressure difference between the cells in a bipolar battery.

FIG. 4 shows a bipolar battery 20 in cross section having five cells. The battery comprises a negative end terminal 21 and a positive end terminal 22, each having a negative electrode 12 and a positive electrode 13, respectively. No hydrophobic barrier needs to be provided around the electrodes 12, 13 arranged to the end terminals 21 and 22. Four biplate assemblies 10 are stacked on top of each other in a sandwich structure between the two end terminals 21, 22. A separator 24 is arranged between each adjacent negative 12 and positive 13 electrodes making up a cell, the separator contains an electrolyte and a predetermined percentage of gas passages, about 5% is a typical value for gas passages.

A frame 23 is provided between adjacent biplates 11 and/or a biplate 11 and an end terminal 21 or 22. As indicated in the figure by the arrow 28, gas may migrate from one cell to another and thereby all cells share a common gas space through the gas passages created between the frames 23 and the biplates 11. If an electrode in a cell starts to gas before the others, this pressure will be distributed through-out the whole common gas space.

If the pressure within the common space exceeds a predetermined value, a pressure relief valve 25 will open to connect the common gas space with the ambient environment. The pressure relief valve 25 is arranged through one of the end terminals, in this example the positive end terminal 22 and comprises a feed-through.

Additionally, a pressure sensor 26 may also be mounted through one of the end terminals, in this example the negative end terminal 21, to measure the actual pressure inside the battery cells. The negative end terminal 21 is designed as a part of a metallic casing 27, which is insulated against the biplates 11 and the positive end terminal 22 being a part of the bipolar battery. Each frame 23 is made from an insulating material and is designed in such a way to ensure electrical insulation between each biplate 11 and the metallic casing 27, by providing a recess 23' where the biplates and the positive end terminal are placed during manufacture and are maintained during operation by applying a pressure as indicated by the arrows 29.

The pressure is maintained by folding down a part of the metallic casing 27, and will ensure that each cell has a predetermined width w, which is approximately equal to the height of the frame 23. To avoid an electrical connection between the casing 27 and the positive end terminal 22, there is provided an insulating layer 22' on top of the positive end terminal 22. Alternatively, the cover may be fixed in position by any of several other standard means, including crimping, welding, interference fits, epoxy, heat seal or solvent, depending of the battery case construction and battery application criteria.

Relief valves and pressure sensors are readily available to a man skilled in the arts and are not described in more detail.

The bipolar battery according to FIG. 4 is manufactured by the following steps:
(1) A casing 27 is provided, which will serve as the negative end terminal 21 together with a negative electrode 12.
(2) A first separator 24 is arranged on top of the negative electrode 12 and a first frame 23 is arranged around the electrode 12. Electrolyte is naturally added to the separator.
(3) A first biplate assembly 10, as described in connection with FIGS. 1 and 2, is arranged on top of the frame 23 so that the biplate 11 is positioned in the recess 23'.
(4) A second separator 24, provided with electrolyte, is arranged on top of the negative electrode 12 of the first biplate assembly 10, and a second frame 23 is arranged around the electrode 12.
Step (3) and (4) are repeated until a desired number of cells have been created.
(5) A positive end terminal 22, including a positive electrode 13 and an insulating outer layer 22', is thereafter placed in the recess 23' of the upper frame 23.
(6) A pressure is applied to the stacked components making up the bipolar battery as indicated by arrows 29.
(7) The upper edge 27' of the metallic casing 27 is thereafter folded down to maintain the applied pressure.

The bipolar battery is completed.

Figure 5:
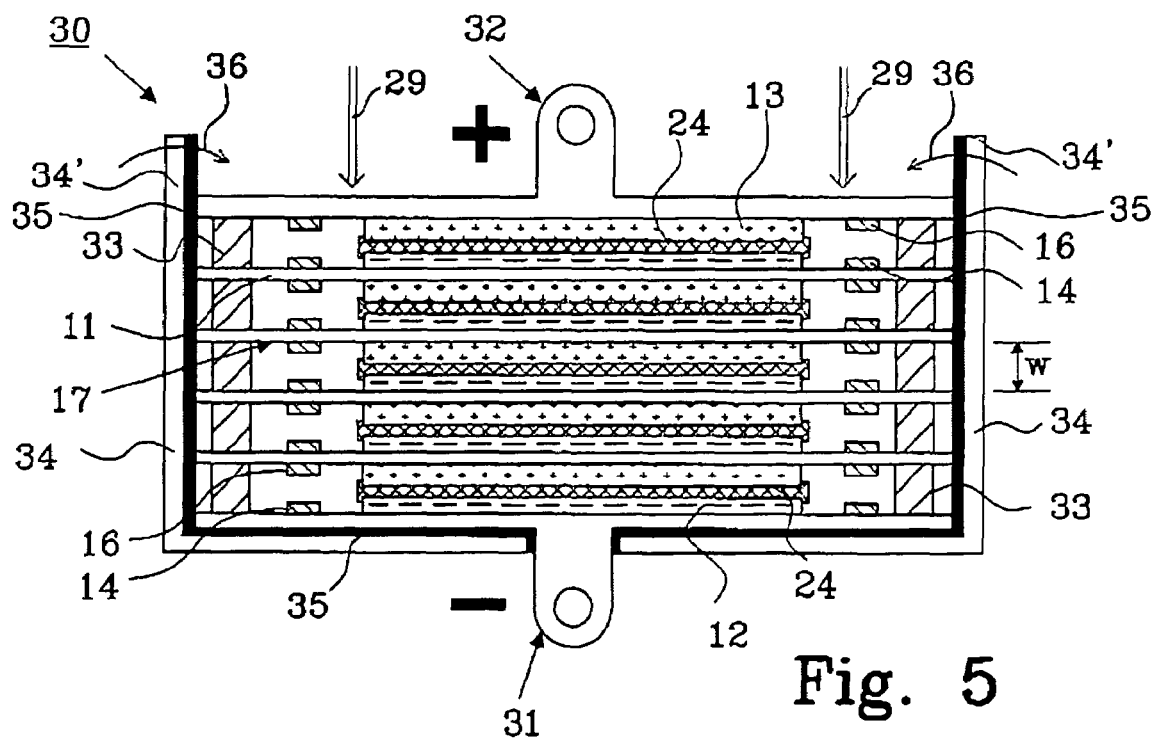
FIG. 5 shows a cross-sectional view of a second embodiment of a bipolar battery according to the present invention.

FIG. 5 shows a second embodiment of a bipolar battery 30 according to the invention, comprising a negative end terminal 31, a positive end terminal 32 and four stacked biplate assemblies 17. The construction of this battery differs from the battery described in connection with FIG. 4 in the following way.

No recess is present in the frame 33 determining the width w of each cell. Hydrophobic electrolyte barriers 14 and 16 are present around both the negative electrode 12 and the positive electrode 13 that will prevent passages of electrolyte from one cell to another around the edge of the biplate 11. is Hydrophobic barriers are even present around the negative 12 and positive 13 electrodes of the end terminals, although this is not necessary to maintain operation of the battery. A metallic casing 34 is provided having an insulating layer 35 arranged on the inside, and a separate negative end terminal 31 is therefore present.

The main feature of the second embodiment is that it is possible to further simplify the manufacturing method by coating the inside of the casing 34 with an insulating layer 35. The frames 33 in this embodiment only have the purpose of determining the width w of each cell and electrically insulate the biplates 11 and end terminals 31, 32 from each other. On the other hand a non-metal casing could be used instead of a metal casing provided with an insulating layer on the inside. Any type of suitable containers known to the battery industry, including moulded plastic containers, could be used as casing for the bipolar battery according to the invention, as long as the battery operates at an appropriate pressure.

It is of course possible to remove the insulating layer from the bottom of the metal casing 34, and allow the negative end terminal 31 to be in contact with the casing 34.

The bipolar battery according to FIG. 5 is manufactured by the following steps:
(1) A casing 34 is provided, having an insulated layer 35 arranged on the inside, or being made from a non-conductive material, such as moulded plastics.
(2) A negative end terminal 31, including a negative electrode 12 with a hydrophobic barrier 14 around it, is arranged within the casing and the terminal is accessible through an opening in the bottom of the casing 34.
(3) A first separator 24 is arranged on top of the negative electrode 12 and a first frame 33 is arranged around the electrode 12. Electrolyte is naturally added to the separator.
(4) A first biplate assembly 17, as described in connection with FIG. 3, is arranged on top of the frame 23 so that the edge of the biplate 11 is close to the insulated layer 35.
(5) A second separator 24, provided with electrolyte, is arranged on top of the negative electrode 12 of the first biplate assembly 17, and a second frame 33 is arranged around the electrode 12.
Step (4) and (5) are repeated until a desired number of cells have been created.
(6) A positive end terminal 32, including a positive electrode 13, and an inner barrier 16, is thereafter placed on top of the upper frame 33.
(7) A pressure is applied to the stacked components making up the bipolar battery as indicated by arrows 29.
(8) The upper edge 34' of the metallic casing 34 is thereafter folded down, as indicated by the arrows 36, or fixed in position in an applicable way if a non-metal casing has been used, to maintain the applied pressure.

The bipolar battery is completed.

The frames 33 provided between the biplates 11, and the biplate 11 and the end terminals 31, 32, will create a common gas space and, as described in connection with FIG. 4, the electrolyte barrier 14 together with the additional barrier 16, will prevent passages of electrolyte from one cell to another. Preferably, a pressure relief value (not shown) is provided together with a pressure sensor (not shown) to monitor the pressure within the battery. The pressure relief valve and the pressure sensor may be mounted on any suitable surface as long as there is a communicating passage to the commonly connected cells of the battery.

In the case where a non-conductive casing has been used, terminations may go from the end plates 31, 32 to terminal penetrations in any fashion known to a person skilled in the art, and could be routed, either internally or externally, to be located on any or the same surface as the end plates.

FIG. 6 shows a planar view of a third embodiment of a biplate assembly 40, and FIG. 7 shows a cross-sectional view along A-A in FIG. 6. A negative electrode 12 and a positive electrode 13 are arranged on each respective side of a biplate 11, as previously described in connection with FIGS. 1-3.

A hydrophobic barrier 41 is provided around the edge of the biplate 11. In this embodiment, a part of the positive and negative side of the biplate 11 is covered with the hydrophobic barrier, although this is not necessary to obtain the advantages of the hydrophobic barrier. However, the biplate will in some applications be very thin and there will be a problem when attaching the hydrophobic barrier only to the edge of the biplate 11.

FIG. 8 shows a third embodiment of a bipolar battery 50 using biplate assemblies 40 as disclosed in FIG. 6 and 7. The basic construction of the battery 50 is the same as the battery described in connection with FIG. 4 with a few exceptions:

Frames 51 of a different type have been used, that are similar to the frames used in the battery described in FIG. 5, having an opening 52 to provide a gas passage between each cell and the space near the casing 27.

At least one ridge 53 is also provided along the inside of the casing 27 to define the position of the edge of the biplate assembly 40. The distance between the casing and the biplate assembly 40 is defined by the height of the ridge 53, and the space created will allow gas passage between the cells.

The hydrophobic barrier 41 is provided on the outside of the frames 51 and the ridge 53 define the space that will allow gas passage on the side of the hydrophobic barrier 41.

The frames 23, 33 and 51, used in the embodiments above, are providing a controlled gaseous leakage between adjacent cells, but the present hydrophobic barrier 14, 16 and 41 will prohibit the creating of an electrolyte path between adjacent cells. To further enhance the built-in gaseous leakage between the cells, a rough surface of the frame may be provided to ensure a higher degree of non-sealing between the frame and the biplates 11.

The frame 23, 33 and 51 preferably has good heat conductive properties, so that heat created within the battery easily can escape through the casing 27, 34. Preferably, the insulation 35 provided on the inside of the casing 34 in FIG. 5 also has good heat conducting properties for the same reason as discussed above.

The positive active material in a NiMH battery manufactured according to the invention is preferably made from spherical nickel hydroxide (supplied by OMG, Finland); Nickel 210 fiber (supplied by INCO, USA); and Powdered Cobalt (obtainable from various suppliers). The negative material is preferably made with Metal Hydride (supplied by Treibacher, Austria); and Nickel 255 fiber (supplied by INCO, USA). There are numerous suppliers of all these materials, particularly in Japan and China, where the majority of Nickel Metal Hydride cells presently are manufactured.

No other materials, such as conductive additives, binders, etc. are used in the following illustrative example. The nickel fibers INCO 210 and 255 serve as the conductive additives and make contact with the conductive biplate, conducting current from the active material directly to the conductive biplate. Any type of electrode construction could be used either as it is, or with a layer of any conductive material that improves contact, to benefit from the construction according to the invention.

The essential feature of the invention is the built-in leakage that will provide the possibility to use of the battery container as the common pressure vessel without having to provide a liquid and a gas seal in each cell, nor a hole with a barrier in each biplate. The presence of at least one hydrophobic barrier between a positive and a negative electrode arranged adjacent to a biplate will prevent electrolyte leakage between adjacent cells, as discussed above.

The concept of the invention will work for a wide variety of dimensions, such as the physical dimensions of the frame, the thickness of the electrodes, biplates, and separator. The key is the distance between the biplates defining a cell. It is necessary that the gap is sufficient that any capillary wetting forces between the biplates are less than the hydrophobic properties of the barriers. The gap is equally dependent upon the quality of electrolyte available in the battery. Obviously, a battery that is flooded with electrolyte will not be prevented from forming an electrolyte bridge regardless of the hydrophobic properties and dimensions of the barriers. A complete seal is required for flooded batteries.

In the design of starved electrolyte batteries, which is applicable to the present invention, is how all sealed Nickel Metal Hydride batteries are designed. The quantity of electrolyte plays an important factor in the life of the battery. The electrodes and the separator compete for the available electrolyte, along with the wetting of the biplate surface. The lower amount of electrolyte, the smaller the barrier requirement, but also the lower the life of the battery.

Design features such as the compression of the separator impacts the capillary forces within the separator. The choice of separator could be relevant due to their ability to retain and absorb electrolyte. Cylindrical cells require strong separator to withstand the automated winding assembly process. As a consequence, they use larger diameter fibres to achieve the strength. Separators made with these fibres have lower electrolyte retention and absorption properties, and lose electrolyte to the electrodes as the electrodes dry or absorb electrolyte within the electrode. The use of finer fibres, with a higher absorption and electrolyte retention properties are desirable in batteries, and are the preferred material for use in the bipolar battery with built-in leakage. The separator fibers should have a diameter in the range of 0.0001 to 0.015 inches (approx. 2.5 to 400 μm), preferably in the range of 0.003 to 0.008 inches (approx. 76 to 200μm).

The frame material may be any suitable material that is non-conductive and that is compatible with the electrochemical environment inside the battery cells. The preferred approach is to mould the frames, and any injection mouldable material from the generic families of ABS or polypropylene is acceptable. A mouldable thermoplastic elastomer compound could also be used as frame material. An example of a material for use in moulding the frames is Kraton G 7705 or equivalent. When this material is compressed it forms an adequate seal to prevent electrolyte paths, and it is also possible to mould passages in the material to ensure gas flow leakage paths as desired, see FIGS. 9-11.

The invention relies on the feature of allowing gas passage, but preventing passage of electrolyte, between cells. The required dimension of the gas passage must be adequate for the passage of all gasses generated on overcharge, and a lower limit for cells up to 10 AH (Ampere Hours) is an opening with a cross section of 0.003 square inches (approx. 1.94 mm$^2$). The cross section of the opening is proportionally larger, or more openings are provided, as the battery capacity for each cell increases.

The width of the hydrophobic barrier, which prevents electrolyte migration between adjacent cells, is preferably in the range 0.020 to 0.125 inches (approx. 0.5 to 3 mm), and more preferably in the range of 0.050 to 0.060 inches (approx. 1.3 to 1.5 mm. The thickness of the hydrophobic barrier depends on the material and means of application. As thin as possible is preferred.

An illustrative example of a biplate assembly and a bipolar NiMH battery will be described in more detail below as a non-limited example to further illustrate the benefits from the inventive design.

In an example of a 10 AH cell in a NiMH battery, the height of the frame depends on the application and thus the thickness of the electrodes. The thickness of the electrodes is in the range of 0.002 to 0.050 inches (approx. 0.05 to 1.3 mm), with a preferred range of 0.010 to 0.035 inches (approx. 0.25 to 0.90 mm). The electrodes normally have the shape of a rectangle with a width of not more than 6 inches (approx. 150 mm) due to temperature requirements and a hydrophobic barrier arranged around each electrode. The thickness of the biplate is in the range of 0.001 to 0.005 inches (approx. 25 to 125 μm), preferably in the range of 0.0025 to 0.003 inches (approx. 64 to 76 μm).

Figure 9:
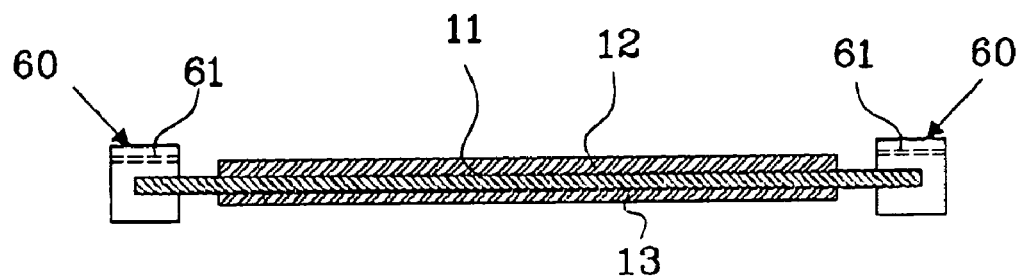
FIG. 9 shows a first embodiment of a combined frame and hydrophobic barrier according to the invention.
Figure 10:
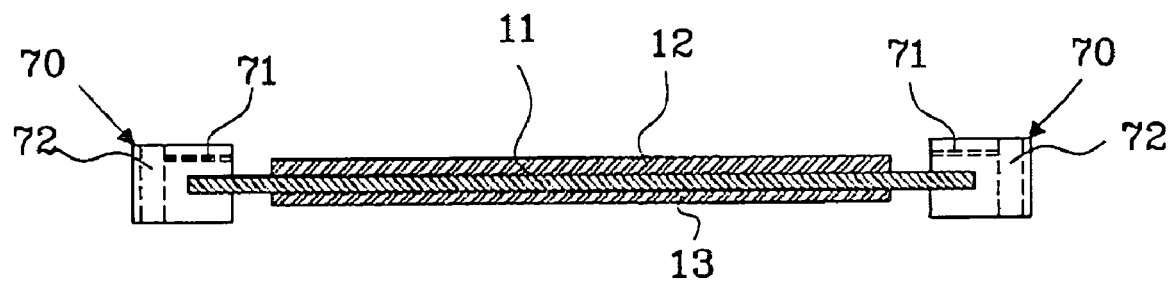
FIG. 10 shows a second embodiment of a combined frame and hydrophobic barrier according to the invention.
Figure 11:
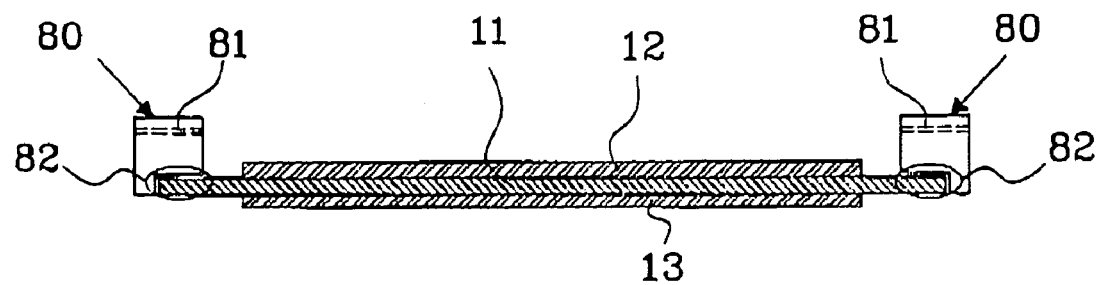
FIG. 11 shows a third embodiment of a combined frame and hydrophobic barrier according to the invention.

FIGS. 9-11 show three different embodiments for a combined frame and hydrophobic barrier.

The first embodiment of a frame 60 made from a hydrophobic material is shown in FIG. 9. The frame is moulded to the biplate 11 and a moulded channel 61, extending to the outside of the frame, is provided in the frame 60.

The second embodiment, shown in FIG. 10, comprises a frame 70 made from a hydrophobic material. The frame is moulded to the biplate 11, as the frame 60 discussed in connection with FIG. 9, and a moulded channel 71, extends from the inside of the battery cell to a moulded hole 72 within the frame 70.

The third embodiment, shown in FIG. 11, also comprises a frame 80 made from a hydrophobic material. The frame is separately moulded, provided with a recess 81 for holding the biplate 11 and provided with a moulded channel 82, extending to the outside of the frame 80.

When the hydrophobic frame 60-80, as disclosed in connection with FIGS. 9 to 11, is put under pressure, during the last stage of the assembly process, it will provide an adequate seal against the biplate 11 to prevent any electrolyte paths to be formed between adjacent cells. Thus eliminating the need for a separately arranged hydrophobic barrier, as illustrated in FIGS. 1 to 8.

The means used to provide the pressure inside the finally assembled battery could also include the use of tie rods between the end plates. The tie rods could even be applied in a central part of the end plates, which indicate that they pass through the electrode area. If one or more holes within the electrode area are necessary, a hydrophobic barrier is needed around each hole to prevent electrolyte leakage between adjacent cells and equivalent clearance of the tie rods from the electrodes to the separator, from the separator to the hydrophobic barrier, and the designed hole.

The invention claimed is:

1. A bipolar battery having at least two battery cells comprising:
    a sealed housing,
    a negative end terminal having a negative electrode,
    a positive end terminal having a positive electrode,
    at least one biplate assembly having a negative electrode mounted on a negative side of a biplate and a positive electrode mounted on a positive side, being opposite to said negative side, of said biplate, arranged in a sandwich structure between said negative and said positive end terminals,
    a separator arranged between each negative and positive electrode forming a battery cell, said separator including an electrolyte,
    an inner barrier of a hydrophobic material arranged around at least one electrode on said biplate, whereby said inner barrier prevents an electrolyte path from one cell to another cell, and
    a non-conductive plastic polymer frame interposed between said biplate and said positive and said negative end terminals, said frame being attached to said biplate to permit gas to pass between said frame and said biplate, thereby creating a common gas space for all cells in the battery.

2. The bipolar battery according to claim 1, wherein the inner barrier is arranged at least around the negative electrode on the negative side of said biplate.

3. The bipolar battery according to claim 2, wherein an additional inner barrier is arranged around the positive electrode on the positive side of said biplate.

4. The bipolar battery according to claim 1, wherein one of the end terminals is provided with one of
    a pressure relief valve to allow the common gas space to be connected to the ambient environment if the pressure in the common gas space exceeds a predetermined value or
    a pressure sensor to monitor the pressure inside the common gas space.

5. The bipolar battery according to claim 1, wherein the frame is made from a hydrophobic material with moulded gas passages, whereby the frame acts as the inner barrier.

6. The bipolar battery according to claim 1, wherein the sealed housing comprises a casing to which at least one of said end terminals and said biplate are electrically insulated, the casing being attached to one of said end terminals in a gas tight manner thereby providing said sealed housing.

7. The bipolar battery according to claim 6, wherein the inside of said casing is at least partially arranged with an insulating layer to provide said insulation.

8. The bipolar battery according to claim 6, wherein each frame is made of an electrically insulating material and is arranged within the battery to provide said insulation.

9. The bipolar battery according to claim 1, wherein said hydrophobic barrier is a flouropolymer material.

10. The bipolar battery according to claim 1, wherein the bipolar battery is a NiMH battery.

11. A method to manufacture a bipolar battery having at least two cells, the method comprising:
    providing a housing,
    arranging a negative end terminal having a negative electrode within the housing,
    arranging at least one biplate assembly having a negative electrode mounted on a negative side of a biplate and a positive electrode mounted on a positive side, being opposite to said negative side, of said biplate, in a sandwich structure between said negative end terminal and a positive end terminal, having a positive electrode within said housing, arranging a separator between each negative and positive electrode forming a battery cell, said separator including an electrolyte, providing an inner barrier of a hydrophobic material arranged around at least one electrode on said biplate, whereby said inner barrier prevents an electrolyte path from one cell to another cell, interposing a non-conductive plastic polymer frame between said biplate and said positive and said negative end terminals, said frame being attached to said biplate to permit gas to pass between said frame and said biplate, thereby creating a common gas space for all cells in the battery, and sealing said housing.

12. The method according to claim 11, wherein the inner barrier is arranged at least around the negative electrode on the negative side of said biplate.

13. The method according to claim 12, wherein an additional inner barrier is arranged around the positive electrode on the positive side of said biplate.

14. The method according to claim 11, wherein the method further comprises one of providing a pressure relief valve in one of said end terminals to allow the common gas space to be connected to the ambient environment if the pressure in the common gas space exceeds a predetermined value or providing a pressure sensor to one of the end terminals to monitor the pressure inside the common gas space.

15. The method according to claim 11, wherein the provided frame is made from a hydrophobic material and arranged in such a way that it acts as the inner barrier.

16. The method according to claim 11, wherein the method further comprises:

arranging at least one of said end terminals and said biplate into a casing in an electrically insulated manner, and attaching and sealing the casing to one of said end terminals in a gas tight manner thereby providing said sealed housing.

17. The method according to claim 16, wherein the method further comprises providing an electrically insulating layer at least partially arranged to the inside of a metallic casing to provide said insulation.

18. The method according to claim 16, wherein providing a frame further includes providing a frame made of an electrically insulating material and arranging said frame within the battery to provide said insulation.

19. The method according to claim 11, wherein providing an inner barrier includes providing an inner barrier made of a flouropolymer material.

20. The method according to claim 11, wherein the bipolar battery is selected to be a NiMH battery.

* * * * *

UNITED STATES PATENT AND TRADEMARK OFFICE
CERTIFICATE OF CORRECTION

PATENT NO. : 7,258,949 B2  Page 1 of 1
APPLICATION NO. : 10/434168
DATED : August 21, 2007
INVENTOR(S) : Lars Frederiksson and Neil H. Puester It is certified that error appears in the above-identified patent and that said Letters Patent is hereby corrected as shown below:

On title page

At item (12): Please change "Frederiksson et al." to --Fredriksson et al.--.

At item (75): Please change "Lars Frederiksson" to --Lars Fredriksson--.

Signed and Sealed this

Thirteenth Day of May, 2008

JON W. DUDAS
*Director of the United States Patent and Trademark Office*